Feb. 19, 1935. G. R. ANDERSON 1,991,356
BRUSH HOLDER FOR ELECTRIC MACHINES
Filed March 17, 1932   2 Sheets-Sheet 1
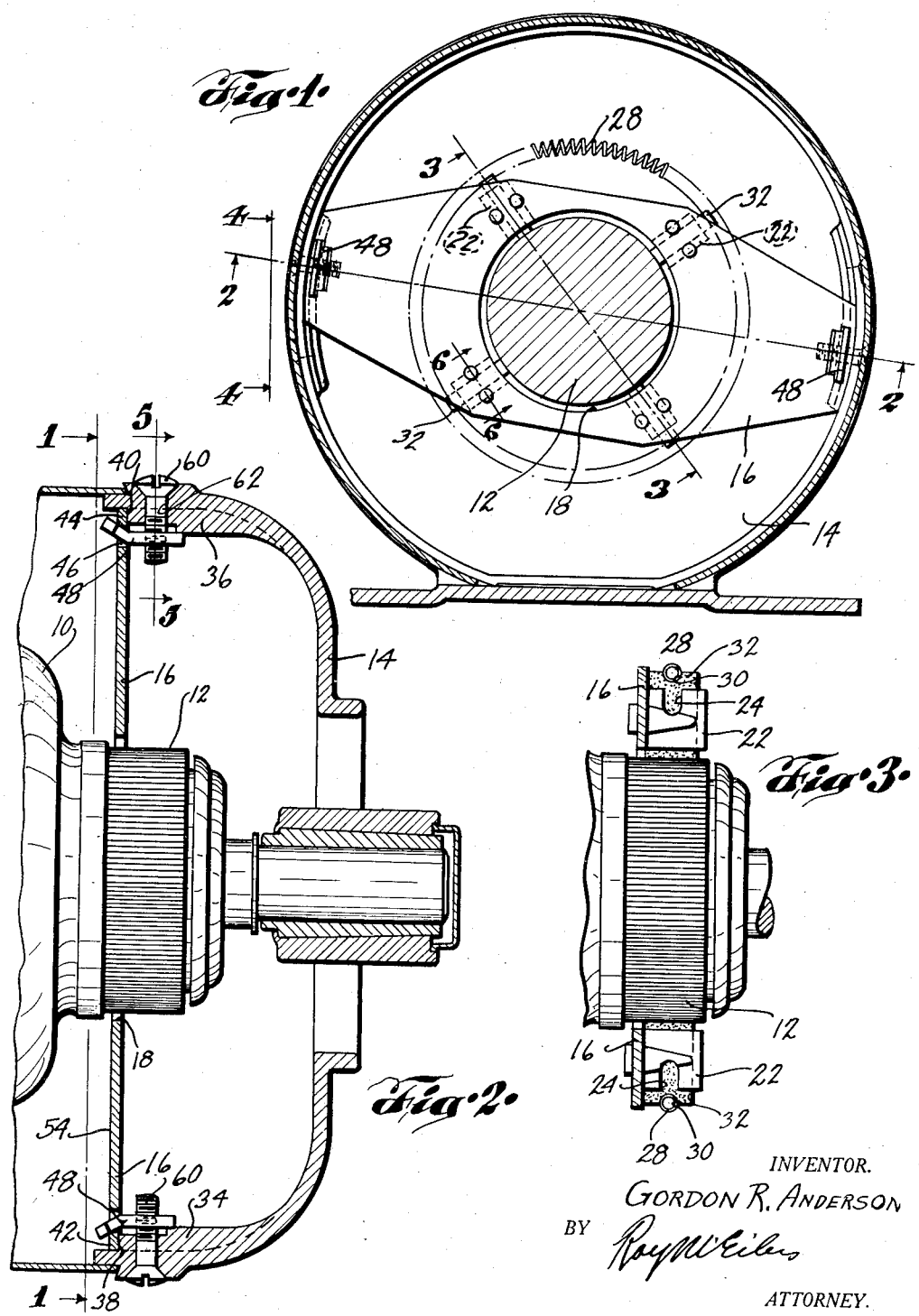
INVENTOR.
GORDON R. ANDERSON
BY Roy M. Eilers
ATTORNEY.

Feb. 19, 1935.  G. R. ANDERSON  1,991,356
BRUSH HOLDER FOR ELECTRIC MACHINES
Filed March 17, 1932  2 Sheets-Sheet 2
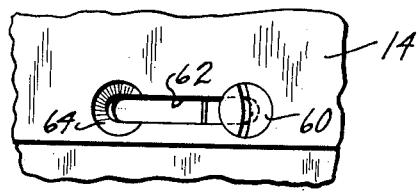
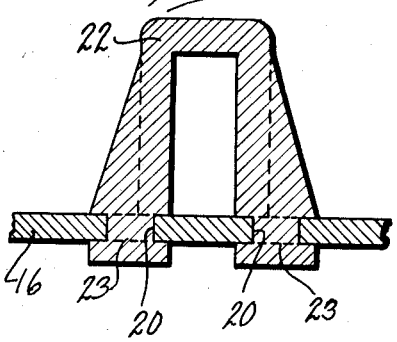
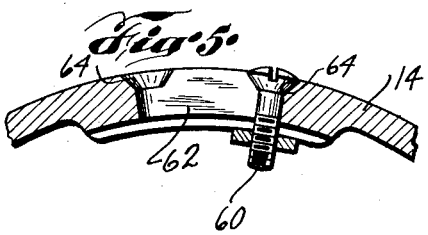
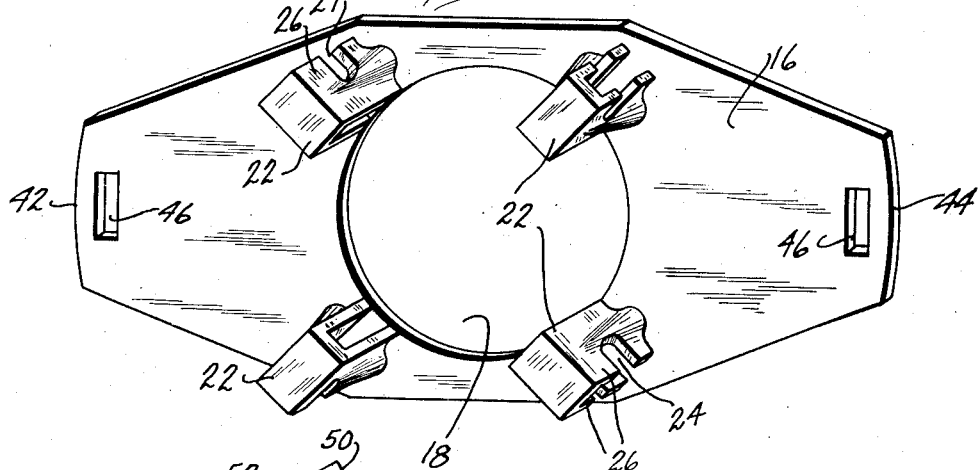
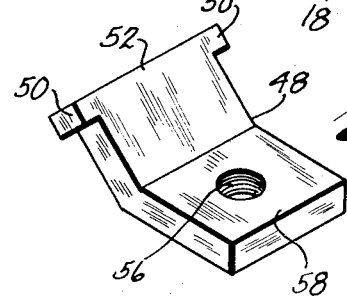
INVENTOR.
GORDON R. ANDERSON
BY
ATTORNEY.

Patented Feb. 19, 1935

1,991,356

UNITED STATES PATENT OFFICE 1,991,356

BRUSH HOLDER FOR ELECTRIC MACHINES

Gordon R. Anderson, Beloit, Wis., assignor to Fairbanks, Morse & Co., Chicago, Ill., a corporation of Illinois Application March 17, 1932, Serial No. 599,401

10 Claims. (Cl. 171—324)

This invention relates to improvements in brush holders for electric machines, and more particularly to an improved, simplified brush-positioning structure for use with electric machines of commutator type.

An object of this invention is to provide an improved brush holder assembly having a single bracket member, with the brush holders die-cast thereon in predetermined, radially spaced, fixed positions; the bracket being held, preferably, by suitable clamps, secured in the bearing arm at the commutator end of the machine.

A further object of this invention is to provide an improved brush holder assembly which is uniformly constructed of relatively few parts, the parts thereof being comparatively simple to manufacture and assemble, and adapted for ready interchangeability.

A still further object of this invention is to provide an improved brush holder assembly which is so secured to an adjacent bearing arm or like frame member, that the brushes may be shifted by manipulation of a brush assembly bracket, from a point external of the frame of the machine, without disturbing or removing any part of the assembled machine.

Further objects and advantages will appear from the following description of a preferred embodiment of the invention, and from the appended drawings, in which:

Fig. 1 is a sectional end elevation of the machine as taken along the line 1—1 in Fig. 2, showing one position of the brush holder assembly; Fig. 2 is a fragmentary, longitudinal sectional elevation of the machine as it would be viewed along the line 2—2 in Fig. 1; Fig. 3 is a fragmentary longitudinal elevation of the armature, commutator and brush assembly as taken along the line 3—3 in Fig. 1; Figs. 4 and 5 are, respectively, fragmentary plan and end elevations of portions of a bearing arm at the commutator end of the machine, and taken, respectively, along the line 4—4 of Fig. 1, and line 5—5 in Fig. 2, these views showing the brush assembly securing means, and a slot provided for shifting the brush assembly bracket; Fig. 6 is a sectional end elevation of a brush holder, as shown along the line 6—6 in Fig. 1; Fig. 7 is a plan view, in perspective, of the assembled brush holders and frame, and Fig. 8 is an elevation in perspective, of a brush holder bracket clamping member or lug.

Referring now by numerals of reference to the parts of this invention, as embodied in a small single phase motor, designed, preferably for four brushes, 10, 12 and 14 designate, respectively, the usual armature, commutator and commutator-end bearing arm. A bracket member 16, arranged to support and position the several brush holders about the circumferential surface of the commutator 12, is formed, preferably, of a sheet steel stamping. An aperture 18 is formed, centrally of the bracket member, as by punching, to provide clearance about the commutator 12 when the brush holder assembly is in operative position, as shown in Figs. 1 and 2. Paired apertures 20, preferably punched in the bracket 16, are radially positioned in predetermined angularly spaced relation about the aperture 18. Substantially U-shaped brush holders 22, preferably formed by die casting, are secured to the member 16 in the paired apertures 20, by casting the holders upon the apertured portions of the bracket or plate, in such a manner that, upon pouring the holders, the casting metal extends through holes 20, and spreads on the opposite side of the plate to form headed, integral securing pins 23. As shown in Fig. 7, there are preferably four such brush holders on the bracket member 16, arranged in ninety degree spaced relation. As will be readily understood, the brush holder assembly is not limited to an arrangement requiring four brush holders, but a greater or a lesser number may be employed, depending, of course, upon the design requirements of the electric machine to which the assembly is to be applied. To facilitate the insertion or removal of brushes, finger slots 24 are provided in the side walls 26 of the respective brush holders, as best shown in Fig. 7. A circular coiled garter spring 28, adapted to seat in slots 30 in the outer ends of the brushes 32, is provided to retain the brushes in the brush holders, and to maintain the brushes in spring-pressed engagement with the commutator surface. The brushes may be insulated from electrical contact with the brush holders, and the garter spring, by any suitable expedient (not shown), such as by employing certain of the insulating materials well known to the art.

The bearing arm 14 is provided with diametrically opposite lugs 34 and 36, formed integrally with the inner peripheral surface of the arm, and adjacent the inner end face thereof. The lugs form notched shoulders 38 and 40 which are adapted to receive and engage, respectively, the ends 42 and 44 of the brush holder plate or bracket 16, for properly positioning the brush holder assembly about the commutator 12. A rectangular slot 46, one adjacent each of the ends 42 and 44 of the brush holder bracket, and formed preferably, as by punching, at the time of forming the bracket, is provided to receive therein an angulate retaining lug 48. Terminal lugs 50 are formed, preferably on one end 52 of each lug 48, and are adapted to engage portions of the bracket surface about the slot 46 on the armature side 54 of the bracket, (Fig. 2) to secure the bracket to the bearing arm 14. A threaded aperture 56, adjacent the lug end 58, is provided to receive the threaded end of a bolt 60, secured in the bearing arm. The bolt 60 extends through and is frictionally and adjustably positionable along a transverse slot 62, in the bearing arm, as determined by the required position of the brush assembly, for example, for reversing direction of rotation of the armature of a motor, or for adjusting, generally, as may be desired, the brush setting of any commutator machine. The length of each slot 62, then, is necessarily to be determined according to the desired angle of brush movement. In case this expedient is employed primarily for changing direction of motor rotation, there may be provided at each end of the slots, countersunk portions 64, to receive the bolt heads, and at the same time, to prevent any change of brush setting once the bolt has been securely drawn up. The method of securing the brush holder bracket in place, will be apparent from Fig. 2. As the bolts are turned, the fastening lugs 48 are drawn into a binding securement in the slots 46.

To assemble the brush holder device in the machine, the brush holder plate is secured to the commutator bearing arm, as by the lugs 48, and the armature and commutator positioned with the shaft end in the bearing arm. The brushes are next inserted in the holders, and the brush retaining garter spring slipped about the brushes into slots 30 provided in the outer brush ends. The armature, brush holder assembly, field, and bearing arms may now be assembled to complete the machine.

When it is desired to change the direction of rotation of the machine, the brushes may be shifted by merely loosening the holder frame securing screws 60, moving the screws say to the opposite ends of the slots 62, or otherwise to the desired extent, and then reclamping the brush assembly by drawing up the screws.

There has heretofore been described a presently preferred arrangement in which the brush holders proper 22, are united to the bracket or plate 16, by casting directly in place, causing the cast metal to extrude through the openings 20. If desired, the members 22 may be formed, substantially, as shown, of pressed material, or cast separately, in which latter case, the portions 23 are extended through the openings 20 and die-formed by pressure or by peening, against the opposite surface of the bracket or plate in a manner to secure the holders thereto.

For simplicity of description of the invention, an application thereof to a small brush type motor, has been described in detail. The arrangement for mounting and adjusting the brush holder assembly, is obviously applicable to a variety of conditions, and may be employed, for example, where it is desirable to provide a separate mounting for the third brush or brushes of D. C. generators. An example of such a use is found in the small electrical machines for automotive use in which the brush shifting expedient might well be employed for effecting generator voltage adjustments. A distinct advantage prevails over constructions heretofore employed in that the change of angular position of the brushes may be effected entirely from the outside of the machine, without requiring the removal of any cover plates or bearing arms or the like, and no details for such adjustment being necessary other than an ordinary screw driver.

It will, of course, be understood that the present description and accompanying drawings refer only to a single embodiment of my invention, and that alterations and modifications may be made without departing from the full intended scope of the invention, as set out in the appended claims.

I claim as my invention:

1. In a brush-carrying assembly for an electric machine, a bracket of plate form provided with spaced apertures, and holders for individual brushes cast onto said bracket, said holders each being provided, in casting, with enlarged portions on opposite sides thereof, the enlarged portions having bracket-gripping projections extending through the apertures and molded in casting into spreading engagement with the opposite face of the plate.

2. In a brush-carrier assembly for an electric machine, a bracket, a plurality of cast metal brush holders arranged in predetermined spaced relation on the bracket, each being formed in assembled relation to the bracket and including securing pins, the bracket having pin-receiving apertures, said pins each being relatively enlarged, in casting, on opposite sides of the bracket, to keep the associated brush holder in assembled relation to the bracket.

3. In an electric machine, a bearing arm of concave form, provided with peripheral slots, a brush carrier bracket disposed within the arm, screws extended through said slots and engaging the bracket, for adjustably securing the bracket, near its ends, to the bearing arm, and means associated with the slots, to define, with said screws, predetermined adjusted positions of the bracket.

4. In an electric machine, including a hollow bearing arm, a plate member within said arm, brush holders and brushes carried by said plate, the bearing arm being transversely slotted, and holding elements associated with the plate member and slidably movable along the slots in the bearing arm, to effect an angular adjustment of the plate member.

5. In an electric machine, a bearing arm, a brush-carrier assembly including a bracket, brush holders carried by said bracket, the bearing arm having elongate peripheral openings therethrough, screw-threaded members extending through said arm openings, into holding relation with said bracket and a plurality of screw seats along each of said elongate openings, coacting with said screw threaded members to establish predetermined adjusted positions of said bracket.

6. In an electric machine, a bearing arm having transverse peripheral slots, a brush-carrier plate having an axial aperture therein, and disposed inwardly of the bearing arm, brushes and brush holders carried by said plate, apertures near opposite ends of said plate, and threadedly operable holding devices, engaging the slots in the bearing arm and the adjacent openings in said plate, and adapted for actuation to permit angular adjustment of said plate.

7. In an electric machine, a brush carrier assembly including a bracket, individual brush holders carried in angularly spaced relation on said bracket, brushes carried by said brush holders, said brushes each having a slot near one end, a rotating structure disposed for engagement by the brushes, and a biasing member closed upon itself and engaging said brush slots, said member being insulated from the brushes and tending concurrently and uniformly to urge said brushes toward the rotating structure.

8. In a brush carrier assembly for electric machines, a bracket, a plurality of brush holders carried in spaced relation by said bracket, brushes in said brush holders, a commutator arranged for engagement by the brushes and a garter spring engaging the several brushes in a manner yieldably and uniformly to urge the brushes into engagement with the commutator.

9. In a brush-carrier assembly for an electric machine, in combination with a frame or casing within which the assembly is mounted, brush holders, a brush holder bracket, screws adapted for adjustably and detachably connecting the bracket to the frame of the machine, guideways in the frame, along which the screws are movable for adjustment, said screws projecting through said guideways for purposes of angular adjustment of the bracket and holders, from points outside of the frame of the machine, and adapted to coact with the ends of the guideways to limit said angular adjustment.

10. In an electric machine of commutator type, a hollow bearing arm forming one end of the frame of the machine and having transverse peripheral screw slots formed therein, a substantially flat bracket in the nature of a plate, having a central aperture of a size to provide a clearance radially beyond the commutator of the machine, brush holders and brushes carried by said bracket, the bracket having slots at its opposite ends, adjacent the respective transverse slots of the bearing arm, bent lug members, one extending through each of said slots in the ends of the plate, and each provided with a tapped aperture extended beneath one of the transverse slots of the bearing arm, and screws extending from without the bearing arm, each through one of said slots and into engagement with the tapped aperture of one of the lugs.

GORDON R. ANDERSON.